United States Patent
Huber et al.

(10) Patent No.: US 10,429,526 B2
(45) Date of Patent: Oct. 1, 2019

(54) ANTINEUTRINO DETECTION BASED ON HETEROGENEOUS SCINTILLATION LATTICE

(71) Applicant: Virginia Tech Intellectual Properties, Inc., Blacksburg, VA (US)

(72) Inventors: Patrick Huber, Blacksburg, VA (US); Jonathan M. Link, Blacksburg, VA (US); Mariani Camillo, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 16/320,941

(22) PCT Filed: Oct. 21, 2016

(86) PCT No.: PCT/US2016/058176
§ 371 (c)(1),
(2) Date: Jan. 25, 2019

(87) PCT Pub. No.: WO2018/022124
PCT Pub. Date: Feb. 1, 2018

(65) Prior Publication Data
US 2019/0170887 A1    Jun. 6, 2019

Related U.S. Application Data

(60) Provisional application No. 62/367,200, filed on Jul. 27, 2016.

(51) Int. Cl.
*G01T 3/06* (2006.01)
*G01T 1/16* (2006.01)

(52) U.S. Cl.
CPC .............. *G01T 3/06* (2013.01); *G01T 1/1606* (2013.01)

(58) Field of Classification Search
CPC .......... G01T 3/06; G01T 1/2018; G01T 1/20; G01T 1/2006; G01T 1/2002; G01T 1/201;
(Continued)

(56) References Cited

U.S. PATENT DOCUMENTS

| 9,505,977 B2* | 11/2016 | Riddle ...................... G01T 1/16 |
| 2007/0187608 A1 | 8/2007 | Inbar |
| 2014/0306117 A1 | 10/2014 | Vacheret et al. |

FOREIGN PATENT DOCUMENTS

RU    2308056 C1    10/2007

OTHER PUBLICATIONS

Russian International Searching Authority; International Search Report & Written Opinon for PCT/US2016/058176; 17 pages; Apr. 6, 2017; Moscow, RU.
(Continued)

*Primary Examiner* — David P Porta
*Assistant Examiner* — Fani Boosalis
(74) *Attorney, Agent, or Firm* — Keith A. Vogt; Vogt IP

(57) ABSTRACT

A radiation detector and detection method comprising one or more antineutrino capture sections having a plurality of cells. The cells including hydrogen, act as scintillators and contain a wavelength shifter. Also included are a plurality of neutron capture layers containing a neutron capture agent. The cells are disposed between said neutron capture layers. The layers act as scintillators to convert the radiation emission of a neutron capture to light for transmission to at least one of the cells and the cells and layers have different scintillation time constants.

21 Claims, 4 Drawing Sheets

(58) Field of Classification Search
CPC ....... G01N 2223/505; G01N 2223/108; G01N 23/2255
See application file for complete search history.

(56) References Cited

OTHER PUBLICATIONS

Vacheret; Novel approaches to neutron and anti-neutrino detection; Royal Holloway Physics Seminar; Feb. 19, 2014; pp. 23-31.

* cited by examiner

ANTINEUTRINO DETECTION BASED ON HETEROGENEOUS SCINTILLATION LATTICE

RELATED APPLICATIONS

This application claims the benefit of U.S. Provisional Application No. 62/367,200, filed Jul. 27, 2016 and herein incorporated by reference.

BACKGROUND OF THE INVENTION

The fact that nuclear reactors are powerful antineutrino sources was realized soon after nuclear reactors became practical; antineutrinos were discovered by Cowan and Reines in 1956 using antineutrinos from the Savannah River reactor. Subsequently, it was pointed out by Mikaelyan in 1978 that antineutrinos can be used to monitor nuclear reactors. This monitoring can be either part of the reactor instrumentation to ensure proper operation of the reactor or it can be used for nuclear non-proliferation safeguards. Antineutrino reactor monitoring has been experimentally demonstrated, but in order to become practical for applications, detectors which can perform at the surface, near nuclear reactors are necessary, preferentially not involving any liquids.

International Atomic Energy Agency (IAEA) safeguards currently are highly personnel intensive, relying extensively on tracking material flow (i.e. the balance between materials received and shipped from any given facility). In order to achieve accuracy and reliability, continuity of knowledge (COK) must be preserved. Maintaining and restoring COK in cases where it has been lost because of equipment malfunctions or operator error puts significant strain on IAEA's technical and personnel infrastructure. Therefore, novel technological approaches which can reduce the required manpower and can gracefully recover from a loss of the COK are highly desirable. The ability to recover from a loss of the COK is particularly useful for countries which are relatively new to the international safeguards regime or have given reason for concern in the past.

Antineutrinos are not directly produced in nuclear fission but result from the subsequent β-decays of the neutron-rich fission fragments. On average there are about 6 antineutrinos emitted per fission and thus, for one gigawatt of thermal power a flux of about $10^{20}$ antineutrinos per second is produced. The total number of emitted neutrinos is proportional to the total number of fissions in the reactor, i. e., the reactor power. Moreover, the distribution of fission fragments, and hence their β-decays, are different for different fissile isotopes. Thus, careful antineutrino spectroscopy provides information not only about the total number of fissions, but also about the fission fractions of the various fissile isotopes contained in the core. This allows one to determine the plutonium content and power level of the reactor core in situ with a standoff distance of tens of meters. The practical feasibility of reactor monitoring using antineutrinos has been demonstrated using small, ton-sized detectors both in the former Soviet Union and the United States. In both cases, the detectors were underground with an overburden equivalent to 10-20 meters of water and the detectors were using a liquid organic scintillator. The obvious advantage is that antineutrino reactor monitoring is independent of any operator declaration or previous fuel history. For most conceivable applications in non-proliferation safeguards, the independence from any auxiliary information provided by this technique makes it unique. Also for applications in reactor instrumentation the independence from other methods allows to obtain complimentary information to what can be achieved by existing systems.

The key to detecting the very rare antineutrino interactions in the relatively background rich environment at the Earth's surface, and very near to the core of a nuclear reactor—is to have a distinct event signature that is hard to mimic with the environmental radiation. In current reactor antineutrino experiments, antineutrinos have been detected using liquid scintillator doped with gadolinium (Gd) through the inverse β-decay reaction

$$\bar{\nu}_e + p \rightarrow e^+ + n. \qquad (1)$$

The $e^+$ results in a prompt in a prompt energy deposition which is followed by a delayed signal induced by the neutron capture on gadolinium that produces multiple γ-rays. Both the prompt energy deposition and the delayed γ-rays will result in ionization in the scintillator, which in turn will emit light. This light is collected and constitutes the actual signal. The coincidence in space and time between these two events serves as a very robust signature that helps to reduce backgrounds to a manageable level. Nevertheless, these experiments are still located deep underground (from 60 to 1,200-meter water equivalent) and they are well removed from the direct gamma and neutron radiation from the reactor core. The ability to determine the position of the prompt $e^+$ event is limited by photon statistics and the ability to determine the location of the neutron capture is limited by the significant range of the γ-rays (10's of cm) produced in the neutron capture on gadolinium.

Recently a novel concept in antineutrino detector technology has been proposed by the SoLiD collaboration. First, they employ $^6$Li as neutron capture agent

$$n + {}^6\text{Li} \rightarrow \alpha + {}^3\text{H}, \qquad (2)$$

and due to the high mass of the α and $^3$H particles, these particles deposit all their energy within a sub-mm distance from their production point, resulting in a very well localized neutron capture signature. In principle, $^6$Li (or most other neutron capture agents) can be dissolved in a liquid scintillator (or solid scintillator), but the electron-equivalent energy deposition would be very low (~0.5 MeV) and there are many accidental background sources that can produce a similar signature making the neutron tag less effective at rejecting backgrounds. A workaround is so-called pulse shape discrimination (PSD) which exploits the fact that in some scintillators (mostly liquid ones) there is a different light emission time profile (typically in the 10s of nano seconds) for particles with a very high energy deposition density. This PSD is a well demonstrated technique in small detectors and requires relatively large amounts of light and fast (and hence expensive) electronics.

In the SoLiD proposal, the $^6$Li comes embedded in thin sheets of $^6$LiF:ZnS(Ag), a commercially available inorganic solid scintillator designed for neutron detection with a very high light yield and a long emission time constant (200 ns). These layers are sandwiched between 50×50×50 mm$^3$ organic plastic scintillator cubes, See FIG. 1A. These cubes serve as antineutrino target and detection medium for the prompt signal. They also act as a neutron moderator reducing the initial neutron energy from a few keV down to thermal energies, which is required for effective neutron capture. The mean light emission timescale for the plastic scintillator is ~10 ns. Thus, the time structure of the signal will distinguish a neutron from any particle depositing energy in the plastic scintillator, since only highly-ionizing massive particles like the α and $^3$H can deposit significant energy in the thin layer of $^6$LiF:ZnS(Ag). This results in a very clean neutron tag. Each cube is optically isolated from the other cubes but not from the $^6$LiF:ZnS(Ag) layer and, the light is collected and read out using wavelength shifting fibers of about 3×3 mm$^2$ cross section. Each cube is crossed by or more two fibers, running along orthogonal axes and parallel to the $^6$LiF:ZnS(Ag) sheets, which provide event locations to the precision of a single cube (see FIG. 1B). The small ratio of the cross sections of the cubes to the fibers results in a low light collection efficiency of less than 0.5%, which ultimately limits the energy resolution. These precise event locations for both the prompt signal and the neutron capture signal, combined with the very clean neutron tag results in good signal efficiency and very large background rejection.

The Raghavan optical lattice has been developed for the LENS experiment and an optical prototype is shown in FIG. 1C. The proposed LENS (for Low Energy Neutrino Spectroscopy) detector was designed to study the neutrinos from the Sun. The spatial granularity of LENS is based on the Raghavan Optical Lattice (ROL) design in which the detector volume is optically segmented into cubes. Between the cubes there is a thin layer of material with a refractive index lower than the one inside the cubes. This gives rise to total internal reflection inside the cubes. As a consequence, light produced inside a cube will be guided by total internal reflection along the three axis of the lattice. We call this process channeling and the resulting light is called channeled light. Coincident hits on photomultiplier tubes at the ends of the channels digitally determine the 3-D location of the event to a precision set by the cube size. Each cell is always viewed by a unique combination of 6 photomultiplier tubes. Thus the ROL effectively acts as a 3-D array of nuclear counters with bench top sensitivity.

FIG. 1C shows a mini-prototype demonstrating the light channeling within the scintillation lattice. The Raghavan optical lattice design provides very good segmentation and efficient light collection with a manageable number of electronics channels. If an ROL is constructed out of solid scintillator cubes its constructions is greatly simplified as the thin layer of lower refractive index material is provided by a tiny air gap between the cubes. Also, a ROL can be built with a two-dimensional readout without giving up any precision in event location.

There is a proposed detector using $^6$LiF:ZnS(Ag) sheets surrounding scintillator bars. This concept achieves spatial segmentation in one dimension by reading the light from each segment separately, which will make scaling to multi-ton detectors very difficult. In the same reference the concept of using a wavelength shifter embedded in the plastic scintillator, in contrast to wavelength shifting fibers has been tested and efficient channeling of light by total internal reflection in the longitudinal direction in the scintillator bar has been observed. Only light generated inside the bar can be channeled by total internal reflection. The light generated in the $^6$LiF:ZnS(Ag) sheets is however external to the bar. The wavelength shifter inside the bar absorbs the light emitted by the sheet and re-emits its isotropically inside the bar, so that it now can be channeled by total internal reflection.

BRIEF SUMMARY OF THE INVENTION

In one embodiment, the present invention provides a novel detector which has a combination of good spatial resolution and clean neutron tagging. This allows backgrounds to be efficiently rejected and the high light-collection efficiency provides superior energy resolution for antineutrino events—both features are necessary prerequisites for monitoring the reactor thermal power, the burn-up and the plutonium content in nuclear reactors.

In a preferred embodiment, the present invention provides systems and methods that are based on solid materials and will work on the surface of the earth.

In another embodiment, the present invention provides a highly efficient and pure neutron tag, tighter temporal and spatial correlation between the positron and the neutron tag to reject random coincident backgrounds, and combines good energy and spatial resolution.

In another embodiment, the present invention provides a detector that has a high spatial resolution and neutron tag purity designed to distinguish random coincident events that occur when a positron-like and neutron-like events happen close together in space and time.

In another embodiment, the present invention provides a detector design which is an arrangement of solid scintillators with essentially no dead material. The benefits of this embodiment include streamlining the assembly, operation, simulation and interpretation of the data.

In another embodiment, the present invention provides a radiation detector comprising a plurality of antineutrino capture sections, the antineutrino capture sections may be comprised of a plurality of optically connected cells. The cells, which may be cubes, cuboids or have cross-sections that are triangular, quadrilateral or polygonal, also have planar surfaces and pairwise parallel surfaces separated by a medium of a lower index of refraction, which may be an air gap. The cells may include hydrogen as a target for an antineutrino, act as scintillators and contain a wavelength shifter. Also include are neutron capture sections which may form layers or sheets, containing a neutron capture agent that emits a radiation emission that remains within the neutron capture section upon the capture of a neutron. The antineutrino capture sections are disposed between the neutron capture sections. The neutron capture sections act as scintillators to convert the radiation emission of a neutron capture to light for transmission to at least one of the cells. The cells and the neutron capture sections have different scintillation time constants. In other embodiments, the scintillation time constant of the neutron capture sections is greater than the scintillation time constant of the antineutrino capture sections.

In other embodiments of the present invention, the cells are optically connected to form axial channels in the antineutrino sections. In addition, the light produced in the neutron capture sections may be transmitted to one or more cells where it is absorbed and emitted isotropically by the wavelength shifter and further axially transmitted by total internal reflection along two or more channels.

In other embodiments of the present invention, the cells are arranged to reconstruct the angle formed by a primary positron and its annihilation γ-rays. The angle may be reconstructed by using the cube that detects a primary positron to form the vertex of the angle and using the cubes that detect the annihilation γ-rays to form the side rays of the angle.

In another embodiment, the present invention provides a method for detecting an antineutrino event. The method includes creating an antineutrino capture event by providing a plurality of radiation capture layers to capture an antineutrino. The antineutrino event capture layers may be comprised of repeating optically coupled cells, the cells having planar surfaces and the cells have pairwise parallel surfaces where the cells abut. The cells used in the method may also include hydrogen or some other medium that act as a target for capturing antineutrinos. The cells also act as scintillators and contain a wavelength shifter. The method also includes creating a neutron capture event by providing a neutron capture medium containing a neutron capture agent for capturing a neutron, the neutron capture medium emits a radiation emission that remains within the capture medium upon the capture of a neutron. Different light pulses of different duration for each capture event are created by adapting the cells and the neutron capture medium to have different scintillation time constants. Useful data as to events is obtained transmitting light through the optically coupled cells along axial channels by total internal reflection where it is read out on the surface of the detector to provide x, y and z coordinates of the event.

In other embodiments, the method may be used to reconstruct the angle formed by a primary positron and its annihilation γ-rays by using the cell that detects a primary positron to form or indicate the vertex of the angle and using the cells that detect the annihilation γ-rays to form or indicate the side rays of the angle.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

In a preferred embodiment, the present invention combines the very clean neutron tag of the SoLiD design with the very high light collection efficiency of a ROL, while maintaining the digital spatial event reconstruction. As shown in FIGS. 2A-2D, radiation detector 10 includes a housing 20, supports 25 and 26 as well as openings 27-29. Arranged within housing 20 are a plurality of neutron capture layers 50-53. Capture layers 50-53 are scintillators that have a predetermined time constant and act as a neutron capture agent that emits a radiation emission that remains within the second capture medium upon the capture of a neutron. Layers 50-53 may be in the form of thin sheets and made from an inorganic material. In a preferred embodiment, capture layers 50-53 are comprised of sheets of $^6$LiF:ZnS(Ag).

Disposed between capture layers 50-53 are a plurality of ROLs 100, 200, and 300 which also function as a capture medium. Although three layers are shown for this embodiment of the present invention, other number combinations of radiation capture layers may be used as well.

Figure 1A:
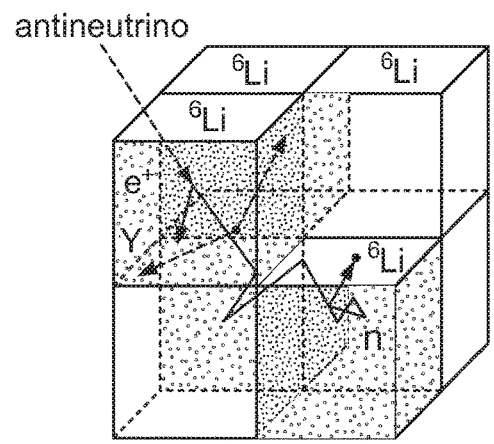
FIG. 1A depicts a detection concept of the SoLiD design.
Figure 1B:
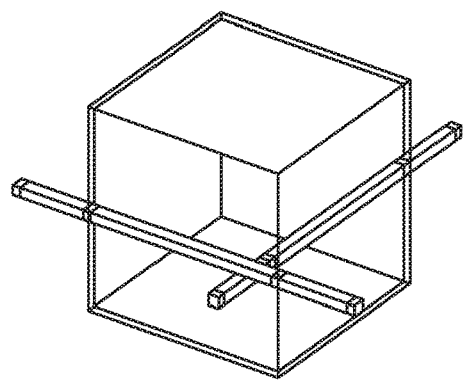
FIG. 1B shows a wavelength-shifting fiber readout of SoLiD.
Figure 1C:
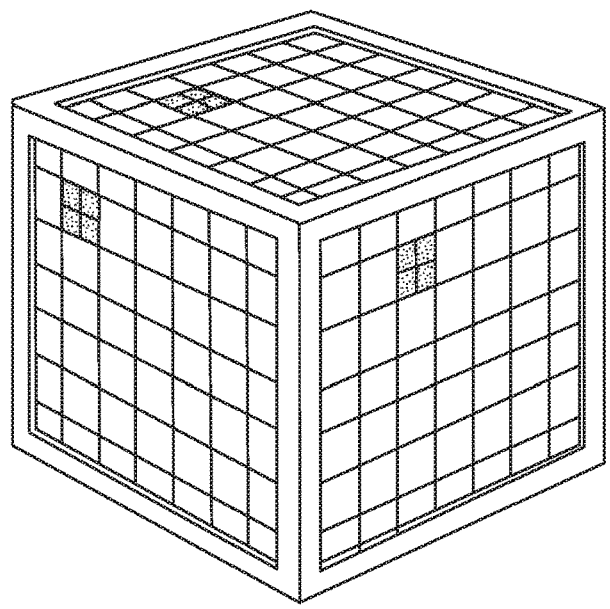
FIG. 1C shows a mini-prototype demonstrating light channeling in the scintillation lattice.
Figure 2A:
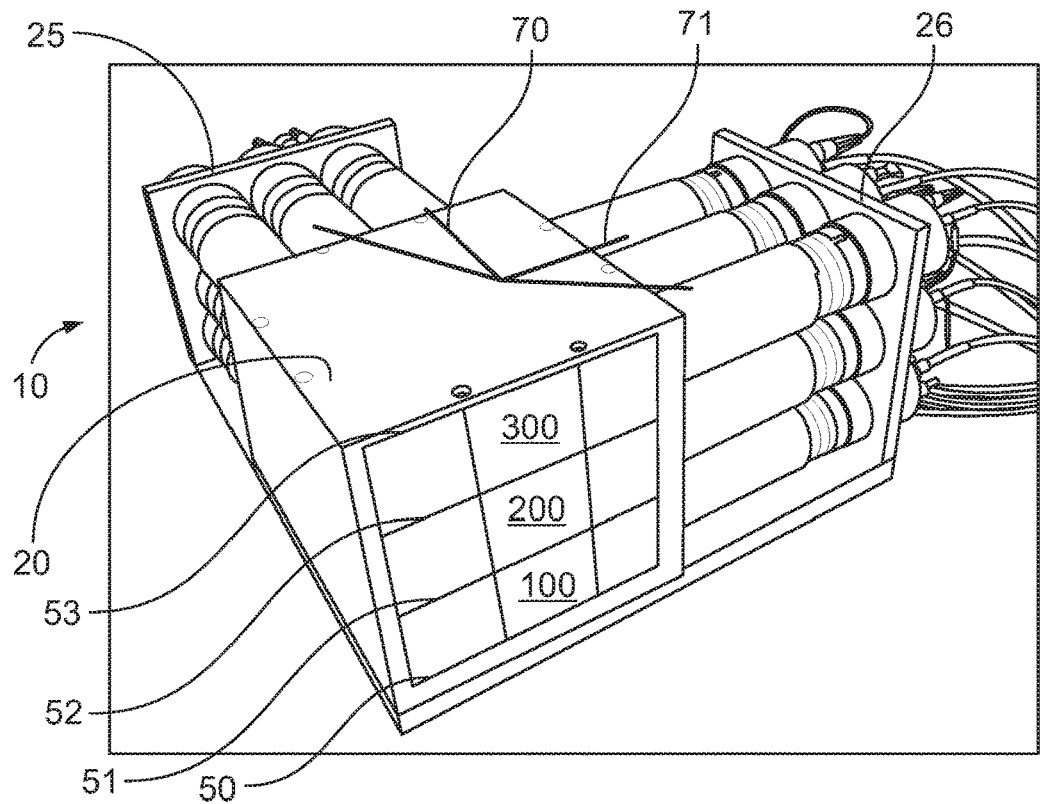
FIG. 2A illustrates an embodiment of the present invention using three ROL layers.
Figure 2B:
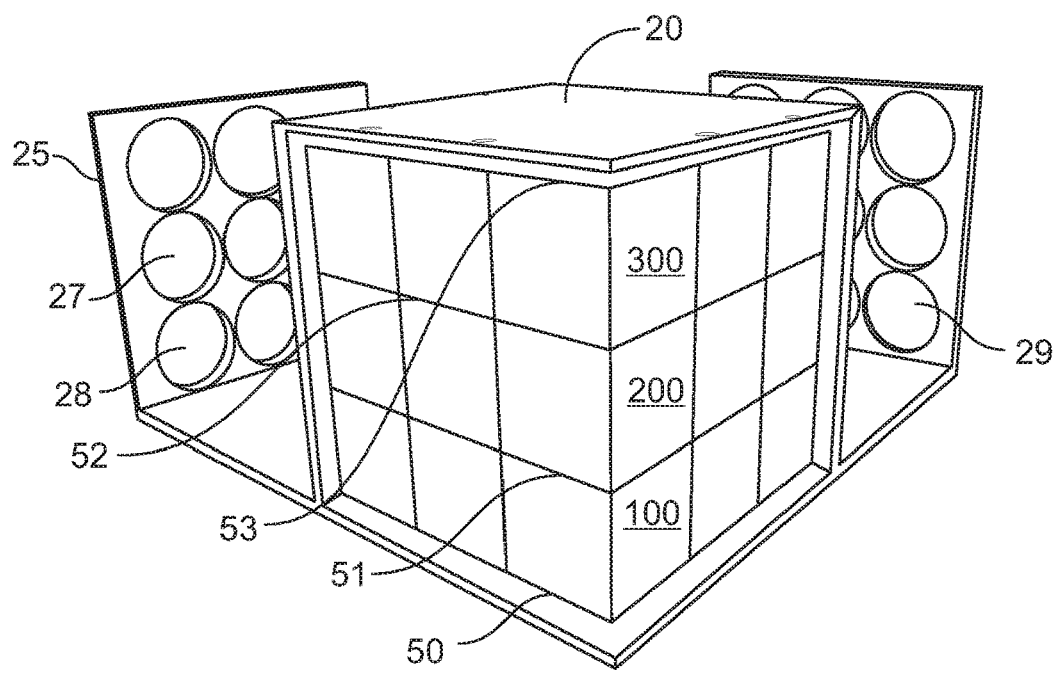
FIG. 2B illustrates how the embodiment shown in FIG. 2A may be arranged into a three-dimensional body.
Figure 2C:
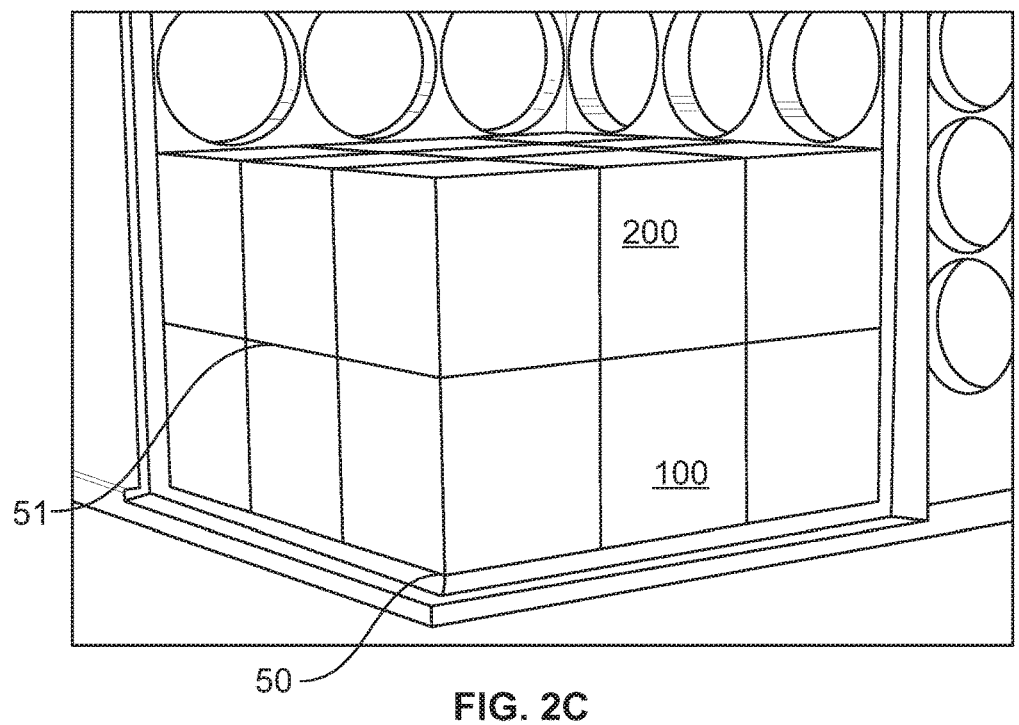
FIG. 2C illustrates how the embodiment shown in FIG. 2A is partially assembled from two layers.
Figure 2D:
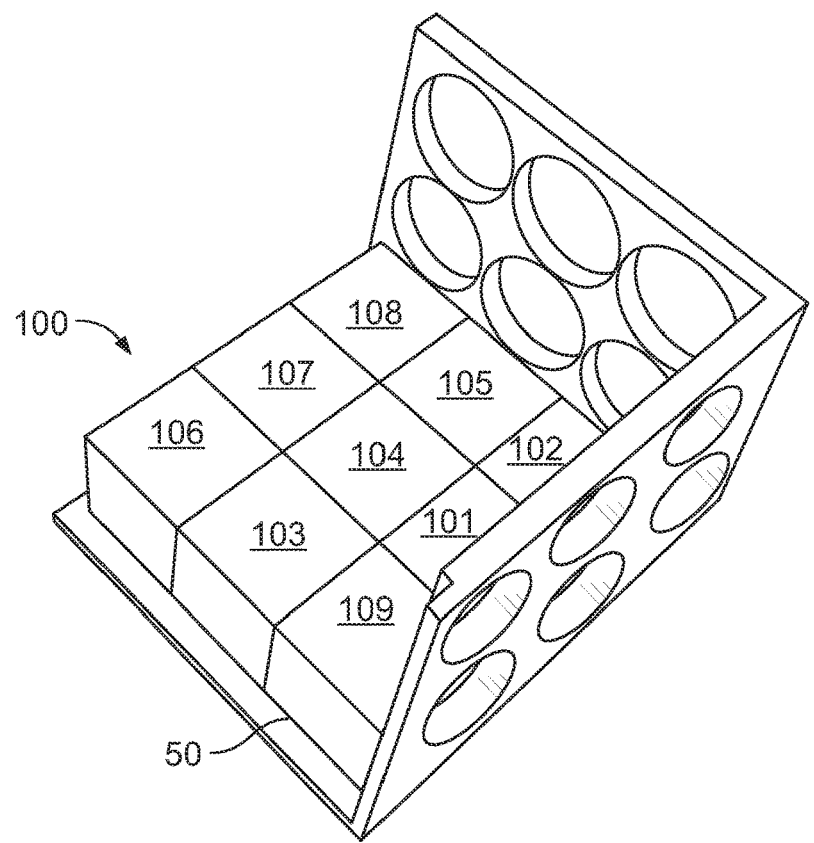
FIG. 2D illustrates how the embodiment shown in FIG. 2A is partially assembled from a single layer.

ROL 100 may be constructed of repeating cells or units 101-109. Although repeating units or cells 101-109 are shown as being uniform in configuration, they do not need to be all of the same configuration. In a preferred embodiment repeating units or cells 101-109 are cubes or cuboids. Other repeating units may have cross-sections that are triangular, quadrilateral or polygonal. In yet another preferred embodiment, the cells have planar surfaces and pairwise parallel surfaces where two cells abut. For example, as shown in FIG. 2D, pairwise parallel surfaces are formed by the abutment between cells 103 and 109. More specifically, the planar surface of cell 103 and the planar surface of cell 109 that abut one another form the pairwise parallel surfaces.

The cells may be made of a material that acts as a target for antineutrinos. A preferred material includes hydrogen. In addition, the cells may be configured to act as a scintillator having a predetermined time constant and contain a wavelength shifter. In addition, the pairwise parallel surfaces may be separated by a medium of a lower index of refraction. In a preferred embodiment, the medium of a lower index of refraction is an air gap.

The wavelength shifter absorbs the light emitted by the ZnS(Ag) outside of the cubes and re-emits it isotropically inside one or more cubes, so that it now can be channeled within the ROL. The cubes may be of an approximate size of 50×50×50 mm$^3$. Additional ROLs, such as 200 and 300, may be similarly constructed.

Light will be collected by photomultiplier tubes (or other suitable light detectors) 70 and 71 which are matched in size to the cube dimensions. Note only a few of the photomultiplier tubes have been numbered in the drawings.

Each plane of the ROL provides a highly efficient system to collect light from the prompt e$^+$ event and provide x-y-coordinates for this event using the light channeled by total internal reflection. Using repeating cells of the same configuration provides a means to obtain x-y-z-coordinates of a radiation event. For example, an x-axis channel is formed by cubes 106-108 in layer 100. A corresponding y-axis channel is formed by cubes 106, 103 and 109. Thus, x-y-z-coordinates may be obtained for any radiation event that occurs inside detector 100.

The neutron will thermalize by scattering inside the plastic comprising the ROL and eventually the majority will be captured on $^6$Li in the $^6$LiF:ZnS(Ag) sheets 50-51. This results in light emitted from this sheet may enter a cube below or above the position of the neutron capture. In some situations, the light emitted enters a cube below and above the position of the neutron capture. The light which enters the cubes will be absorbed by the wavelength shifter and re-emitted in the plastic of the cube. Since the reemission is isotropic and happens inside the cube, a large fraction of this light will be channeled axially and thus reach the photomultiplier tubes. The channeling also will preserve the x-y-coordinates of this event. The prompt signal event (or for that matter any event inside the plastic cubes) will be characterized by a short light emission time, whereas light produced in the $^6$LiF:ZnS(Ag) layer will have a long light emission time. This difference in light emission timescales between the ROLs and capture sheets, as a result of both acting as scintillators having different time constants, will cleanly distinguish neutron capture events in the $^6$LiF:ZnS (Ag) layer from other events in the cubes. The difference in emission timescale for the materials chosen here is about 100 ns. All light will eventually be channeled by the ROL towards the PMT's. Both types of event will have digitally defined x-y-coordinates by virtue of the ROL design and a defined z-coordinate from the plane in which the event takes place.

The advantage of this design compared too SoLiD is the much higher light collection efficiency provided by the ROL for events within the plastic cubes which results in a vastly improved energy resolution, which is critical for many applications.

Compared to an ROL with homogeneously distributed lithium, the neutron tag is much easier to accomplish and will have a much better signal-to-noise ratio since the emission time difference between the sheets and cubes is at least 10 times larger than the one used for traditional PSD and there is significantly more light available. All of the other potential advantages of a ROL in this application are maintained: the subdivisions of the optical lattice will allow a great reduction of the volume in which uncorrelated positron and neutron-like events can be combined through random coincidence to form a primary-secondary pair that mimics the antineutrino signature. The high spatial resolution of the scintillation lattice also allows for the possibility of a powerful background rejection based solely on the topology of the primary event. In combination, the tight neutron tag and the γ-ray topology criteria will provide the background rejection and signal identification efficiency needed to operate on the surface close to a reactor core.

The positron produced in the primary antineutrino interaction will eventually be annihilated with an electron producing two back-to-back γ-rays. In a highly segmented detector, it may be possible to reconstructed the angle formed by the primary positron and its annihilation γ-rays and make a tight selection around 180°. This allows this embodiment of the present invention to uniquely identify the underlying particle as being a positron, which greatly improves background rejection. Currently, no existing antineutrino detector has this ability since it requires very good light collection efficiency and sufficiently fine spatial granularity.

In another embodiment, the present invention provides a detector design where neutrons are tagged with $^6$Li in a small detector volume. For a small detector volume, this has the advantage that all the energy is deposited locally. Unfortunately, the light output from the alpha and triton is heavily quenched in an organic scintillator, producing an electron-equivalent energy of only 0.5 MeV. To achieve the required efficiency and purity, the present invention provides layers of plastic scintillators which may be sandwiched between thin sheets of $^6$Li-loaded, silver activated, zinc sulfide scintillator ($^6$Li/ZnS:Ag). Thin sheets of $^6$Li/ZnS:Ag are sold commercially (Eljen Technology product EJ-426) specifically for neutron detection, and are considered one of the most viable alternatives to $^3$He counters for homeland security applications. ZnS:Ag is a highly efficient scintillator (300% of anthracene), with a mean emission in the blue (450 nm) and a light decay time of 200 ns. This embodiment takes advantage of the relatively long decay and high light yield to obtain a very pure neutron tag. Scintillation light produced in the plastic scintillator is emitted with a mean lifetime of less than 10 ns, so any energy deposition in the plastic will form a short pulse of light. The $^6$Li/ZnS:Ag sheets are sized so that low-mass particles, like electrons, will deposit very little energy as they pass through a sheet, while heavy particles, like alphas and tritons, will deposit all of their energy in a very small volume. A preferred thickness is 0.32 mm. Therefore, the light produced when a neutron captures on $^6$Li forms a long pulse which can easily be distinguished from the short pulses produced in the plastic scintillator. In principle other scintillators besides $^6$Li/ZnS: Ag could be used, provided they are compatible with lithium-6 and provide enough light and have an emission timescale sufficiently longer than the scintillator in the cubes.

The addition of $^6$Li shortens the capture time by about an order of magnitude relative to a detector without lithium-6. The spatial separation between the primary event and the neutron capture position is inherently tight because of the high efficiency of lithium-6 in capturing neutrons. To take advantage of this tight spatial correlation requires good spatial resolution. In homogeneous detectors, the spatial resolution is at best 10 to 15 cm, but difficult to use. To solve this problem, as shown above in FIGS. 2A-2D, the present invention uses a stack of two-dimensional layers of plastic scintillating cubes optically separated by $^6$Li/ZnS:Ag sheets. Each two-dimensional layer forms an ROL allowing event locations to be reconstructed to within the size of a cube. In this design, the resulting spatial resolution is smaller than the mean capture distance, and comes without any reconstruction bias, making it possible to use a spatial cut encompassing only 1% of the detector volume yet containing 95% of IBD events. This is a reduction of a factor 2,000 in the volume available for random coincident backgrounds over prior designs while achieving a Light collection efficiency that optimizes energy resolution.

Figure 3:
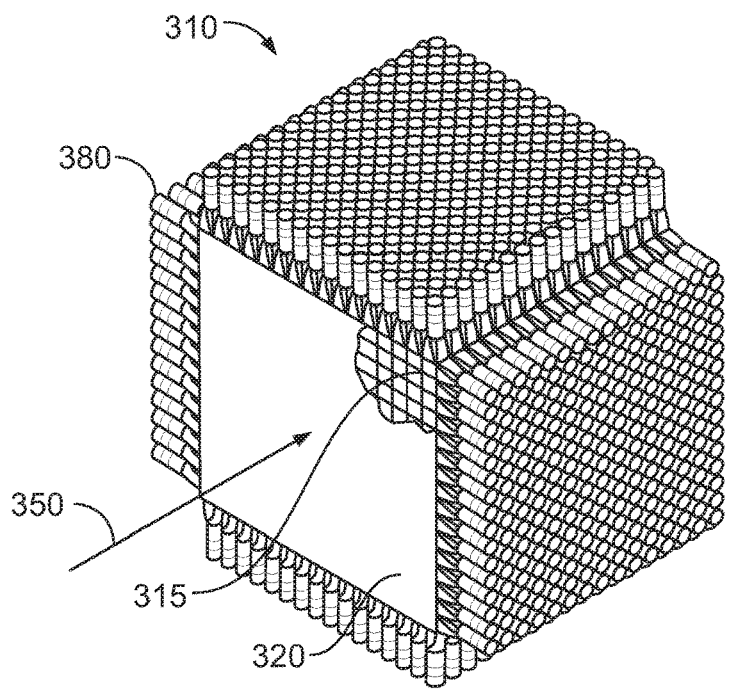
FIG. 3 shows a detector of a second embodiment of the present invention.

In yet another embodiment of the present invention, as shown in FIG. 3, a detector 310 is provided that combines the efficient light collection of the LENS ROL with SoLid's efficient and pure neutron tagging scheme. In order to make this detector work, the plastic scintillator of the SoLid design must be replaced by a wavelength shifting plastic scintillator. The scintillation light produced in the $^6$Li/ZnS:Ag sheets enters the plastic scintillator from the outside and thus, must be absorbed and retransmitted to be captured by total internal reflection. For a one-ton detector, the detector may be constructed of planes of 16×16 optically coupled scintillating cubes 315 that will be stacked alternately with $^6$Li/ZnS:Ag sheets 320. The detector may have 16 cube layers and 17 $^6$Li/ZnS:Ag layers and it will have a volume of 1 m$^3$. The plastic cubes are sold commercially by Eljen Technologies as EJ-260. They have a polyvinyl toluene (PVT) base and a proprietary mix of scintillating and wavelength shifting (WLS) dopants. The scintillator light output is equivalent to 60% of anthracene (approximately 9,200 photons per MeV) with a mean emission wavelength in the green (490 nm). The cubes are 62 mm on each side and are diamond milled to an optically smooth surface. The $^6$Li/ZnS:Ag sheets and detector planes will be vertical and perpendicular to the antineutrino flux 350 to optimize efficiency (the neutron in an IBD event tends to go in the direction of the antineutrino). The cube material is such that the interfaces between cubes is maintained under the full load of the detectors without the use of spacers. The EJ-426 sheets are a homogeneous mix of fine particles of $^6$LiF and ZnS:Ag crystals held together by a colorless hydrocarbon binder. The 0.32 mm thick $^6$Li/ZnS:Ag sits between two 0.25 mm thick clear polyester foils, which chemically separates the PVT from the $^6$Li/ZnS:Ag and maintains the optical air gap. The air gap provides the lower refractive index medium for total internal reflection to take place. The air gap is maintained by the natural surface roughness of the scintillator cubes. As was shown in FIGS. 1A-1D, with the $^6$Li/ZnS:Ag sheets 320 separating cubes 315 into optically isolated planes, the totally internally reflected light propagates in only two dimensions (which are herein called rows and columns). The cube rows and columns will be read out on both ends by a 2 inch (51 mm), high quantum efficiency (~25% at 490 nm), Hamamatsu R6231-100 photomultiplier Tubes 380 PMT). Due to the stochastic nature of light emission in the scintillator and minor, unavoidable misalignment in the ROL, the light exits the detector across the whole 50×50 mm^2 cross section of each row and column of cubes. Thus a light guide can be used the match the square cube face to the round photocathode of the PMT and thus significantly improving light collection efficiency.

To calculate the overall detector efficiency, a uniform source of IBD events throughout the detector was considered. The positrons were assumed to be absorbed immediately at the site of the IBD event (since their range is much lower than the neutron range). The efficiency is then assumed to be the fraction of neutrons that are absorbed in the neutron detecting material (Li-6). The neutrons can also be absorbed in the PVT scintillator, or leaked out of the detector. In either of these cases, the neutron is effectively lost.

The neutron balance is shown in Table. 1. The Li-6 absorption represents a neutron signal for the detector of the present invention, while the other absorption and leakage are not counted as signal. For the basic embodiment of the present invention, an efficiency of 51% is achieved.

TABLE 1

IBD Neutron Balance

| Loss Term | Fraction |
| --- | --- |
| Li-6 absorption (signal) | 51.2% |
| PVT absorption | 33.0% |
| Leakage | 15.8% |
| Other absorption | 1.1% |

Another important aspect of the detector are the space and time-correlations between the positron and neutron events. Ideally, the two events would take place very close to each other in space and time. This would greatly reduce the rate of other random coincident events being recorded as a signal.

Figure 4:
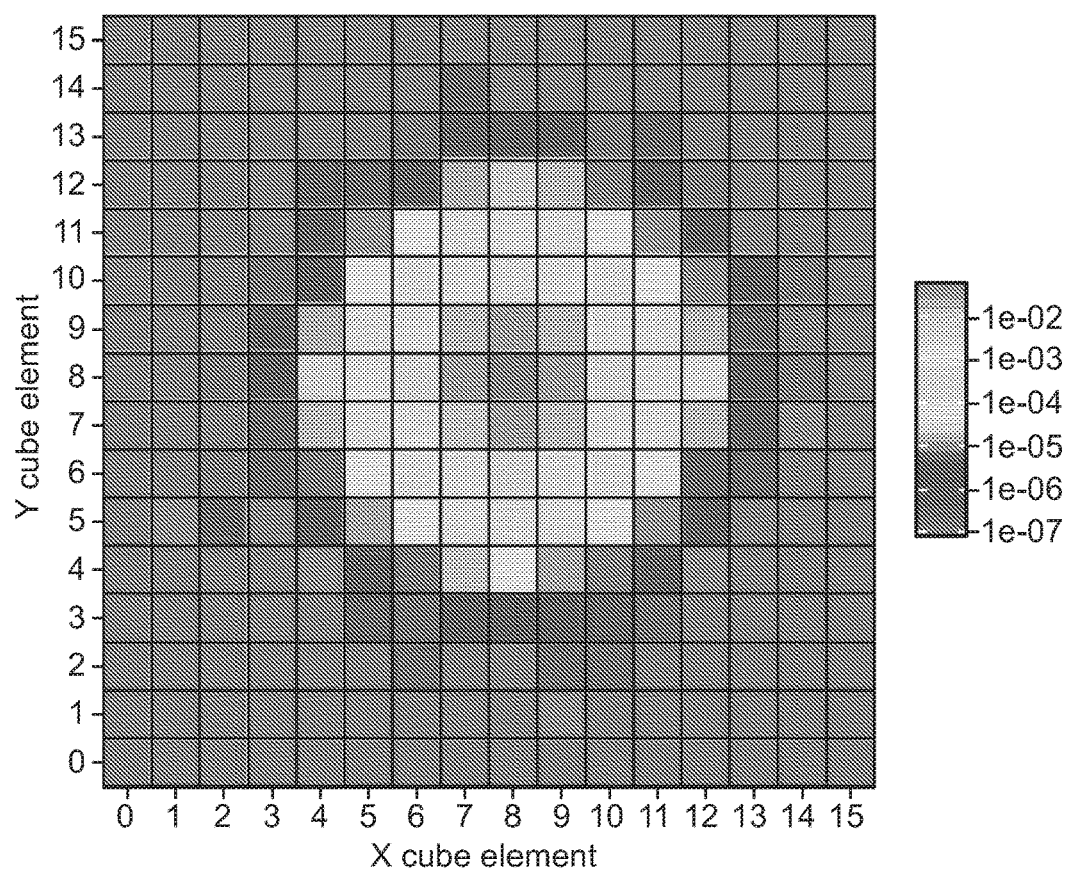
FIG. 4 depicts the X-Y distribution of neutron capture rates in $^6$Li from IBD interactions in cube (8,8,8) for an embodiment of the present invention.

To calculate the time correlation, the same calculation was performed as above, but time-dependent tallies of the neutron absorption in Li-6 were obtained. Again, the positron was assumed to be absorbed at t=0. The time to achieve 90% of the cumulative neutron signal was calculated to be 230 µs To calculate the spatial correlation between the events, the neutron source was placed uniformly in a single cube, and the absorption rate was tallied in all the segments of the ND sheet around the source cube. Most of the IBD-generated neutrons are absorbed close to the cube in which the reaction took place (86% of neutrons are absorbed within 1 cube of the source cube). FIG. 4 shows the neutron absorption rates in the $^6$Li/ZnS:Ag sheets in each cube for an IBD-generated neutron source in the central cube of the detector.

To further improve neutron capture efficiency and to reduce the neutron capture timescale as well as to improve the spatial correlation of the neutron capture with the primary event more lithium-6 can be added to the detector without affecting the benefits of the ROL. The additional lithium is added by cutting each cube into sections and putting an extra sheet of $^6$Li/ZnS:Ag between the sections such that any newly added sheet is parallel to the existing sheets. This is to be done for each plane. In principle, this can be repeated to quarter cubes or further divide cubes. This modification will result in a gain of neutron detection efficiency and a simultaneous decrease in backgrounds.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. A radiation detector, comprising:
 a plurality of antineutrino capture sections, said antineutrino capture sections comprised of a plurality of cells, said cells having planar surfaces and pairwise parallel surfaces;
 said cells including hydrogen as a target for an antineutrino;
 said cells act as scintillators and contain a wavelength shifter;
 said pairwise parallel surfaces separated by a medium of a lower index of refraction;
 a plurality of neutron capture sections containing a neutron capture agent that emits a radiation emission that remains within the neutron capture section upon the capture of a neutron;
 said antineutrino capture sections disposed between said neutron capture sections;
 said neutron capture sections act as scintillators to convert the radiation emission of a neutron capture to light for transmission to at least one of said cells; and
 said cells and said neutron capture sections have different scintillation time constants.

2. The detector of claim 1 wherein said pairwise parallel surfaces are separated by an air gap.

3. The detector of claim 1 wherein said cells are in optical contact.

4. The detector of claim 1 wherein said cells are cubes.

5. The detector of claim 1 wherein said cells are cuboids.

6. The detector of claim 1 wherein said cells have cross-sections that are triangular, quadrilateral or polygonal.

7. The detector of claim 1 said scintillation time constant of said neutron capture sections is greater than the scintillation time constant of said antineutrino capture sections.

8. The detector of claim 1 wherein said cells are optically connected to form axial channels in said antineutrino sections.

9. The detector of claim 1 wherein light produced in said neutron capture sections is transmitted to one or more cells where it is absorbed and emitted isotropically by said wavelength shifter.

10. The detector of claim 1 wherein light transmitted by said wavelength shifter of said neutron capture sections to said cells is emitted isotropically inside one or more cells and further axially transmitted by total internal reflection.

11. The detector of claim 10 wherein light is transmitted along two or more channels.

12. The radiation detector of claim 11 wherein said cuboids have the same configuration.

13. The detector of claim 12 wherein light transmitted by said wavelength shifter of said antineutrino capture layers to said cuboids is emitted isotropically inside one or more cuboids and further axially transmitted along said x-axis and y-axis of said channels.

14. The detector of claim 11 wherein said cuboids are arranged to form axial channels in said antineutrino layers, one of said channels forming an x-axis and another channel forming a y-axis.

15. The detector of claim 14 wherein said cuboids are arranged in optically isolated layers, said x-axis channels isolated by total internal reflection, and said y-axis channels isolated by total internal reflection.

16. The detector of claim 11 wherein said cuboids are further arranged to reconstruct the angle formed by a primary positron and its annihilation γ-rays.

17. The detector of claim 16 wherein the angle is reconstructed by using the cube that detects a primary positron to indicate the vertex of the angle and using the cubes that detect the annihilation γ-rays to indicate the side rays of the angle.

18. A radiation detector, comprising:
a plurality of antineutrino capture layers, said antineutrino capture layers comprised of a plurality of optically coupled cuboids, said cuboids having planar surfaces and pairwise parallel surfaces where said cuboids abut;
said cuboids including hydrogen as a target for antineutrinos;
said cuboids act as scintillators and contain a wavelength shifter;
said pairwise parallel surfaces separated by a medium of a lower index of refraction; a plurality of neutron capture layers adapted to emit a radiation emission that remains within the layers upon the capture of a neutron;
said antineutrino capture layers disposed between said neutron capture layers;
said neutron capture layers act as scintillators to convert the radiation emission of a neutron capture to light for transmission to at least one of said cuboids; and
said cuboids and said neutron capture layers have different scintillation time constants.

19. A method for detecting an antineutrino event comprising the steps of:
creating an antineutrino capture event by providing a plurality of radiation capture layers to capture an antineutrino, said antineutrino event capture layers comprised of repeating optically coupled cells, said cells having planar surfaces and said cells have pairwise parallel surfaces where said cells abut;
said cells including hydrogen as target for capturing antineutrinos;
said cells act as scintillators and contain a wavelength shifter;
said pairwise parallel surfaces separated by a medium of a lower index of refraction;
creating a neutron capture event by providing a neutron capture medium containing a neutron capture agent for capturing a neutron, said neutron capture medium emits a radiation emission that remains within the capture medium upon the capture of a neutron; creating different light pulses of different duration for each capture event by adapting said cells and said neutron capture medium to have different scintillation time constants; and
scintillation light originating in said cells and said neutron capture medium is transmitted through the optically coupled cells along axial channels by total internal reflection where it is read out on the surface of the detector to provide x, y and z coordinates of the event.

20. The method of claim 19 wherein said cells are segmented to determine the angle formed by a primary positron and its annihilation γ-rays.

21. The method of claim 20 wherein the angle is reconstructed by using the cell that detects a primary positron to indicate the vertex of the angle and using the cells that detect the annihilation γ-rays to indicate the side rays of the angle.

* * * * *